Aug. 29, 1961     K. H. JAENSCH     2,998,567

METHOD AND APPARATUS FOR TESTING MAGNETS

Filed May 5, 1958

United States Patent Office 2,998,567
Patented Aug. 29, 1961

2,998,567
METHOD AND APPARATUS FOR TESTING MAGNETS
Klaus H. Jaensch, Rochester, N.Y., assignor to General Dynamics Corporation, a corporation of Delaware
Filed May 5, 1958, Ser. No. 733,089
13 Claims. (Cl. 324—44)

The present invention relates to a method and apparatus for testing magnets, and more particularly, to a method and apparatus for mapping lines of equal magnetic flux density around a magnetic circuit using a cathode ray oscilloscope.

Heretofore, fractions or parts of lines of equal magnetic flux density or lines of magnetic force around a magnetic circuit have been qualitatively determined or mapped by sprinkling iron filings onto a sheet of paper or other suitable insulating surface and bringing the sheet and iron filings into the vicinity of the magnet. The alinement of the loose iron filings into the various lines of magnetic force is not a permanent record, however, and an additional step, such as photographing, for instance, is required in order to have a permanent record of the characteristics of the magnetic field of a particular magnet or magnetic circuit. Furthermore, the iron filing method of determining flux distribution is non-quantitative.

An object of this invention is to provide a new and improved method and apparatus for testing magnets.

Another object of this invention is to provide a new and improved method for making a quantitative determination of flux distribution around a magnet.

Another object of the invention is to provide a new and improved method of testing magnets using cathode ray oscilloscopes.

Yet another object is the provision of a new and improved method and apparatus for mapping lines of magnetic flux around a magnetic circuit.

A further object is the provision of a new and improved method of plotting lines of equal magnetic flux around a magnetic circuit using a cathode ray oscilloscope.

A still further object of this invention is to provide a new and improved method and apparatus for directly providing a permanent record of the lines of equal magnetic flux around a magnetic circuit.

Another object is the provision of a new and improved method of directly photographing lines of equal magnetic flux around a magnetic circuit.

These and other desirable objects may be attained in the manner disclosed as an illustrative embodiment of the invention in the following description and in the accompanying drawings forming a part hereof, in which.

The same reference numerals throughout the several views indicate the same parts.

As is known, magnetic fields deflect the electron beam in cathode ray oscilloscopes, the amount of deflection depending upon the strength of the magnet providing the magnetic field and upon its distance from the electron beam. This principle is utilized according to the teaching of the present invention in a method for testing magnets, and more especially for a method of mapping lines of equal magnetic flux or lines of magnetic force around a magnetic circuit.

Figure 1:
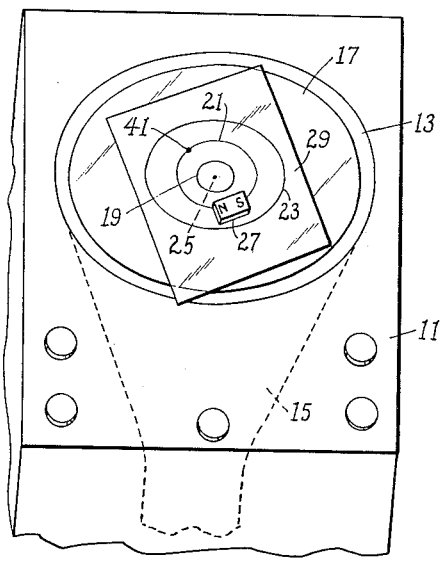
FIG. 1 is a perspective view of the upper portion of a vertically disposed cathode ray oscilloscope including a magnet positioned for plotting points on lines of equal magnetic flux.
Figure 2:
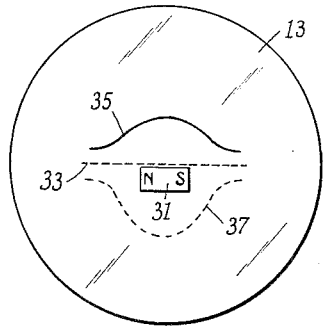
FIG. 2 is a top view of a cathode ray tube and a magnet positioned thereon and illustrating the principles involved in the method according to the present invention.

The principle used in the present method of plotting lines of equal magnetic flux can perhaps be understood more easily by referring first to FIG. 2, which shows diagrammatically the face 13 of a conventional cathode ray tube to which a conventional sweep voltage is applied to cause the ray or electron beam to sweep in a straight line across the face of the tube, making a straight-line trace on the fluorescent screen at the face of the tube as indicated by the dotted line 33. Now if a permanent bar magnet 31 having a north and a south pole is placed on the face 13 of the cathode ray tube, the electron beam of the cathode ray tube will be deflected from the normal straight line 33, proportionally to the strength and direction of the magnetic forces acting on the beam on account of the presence of the magnet 31. Thus the beam will trace on the screen, not the straight line 33, but rather a curved line typically shaped approximately as indicated at 35 when the magnet 31 is positioned as shown. If the magnet be replaced by a stronger magnet similarly positioned, the beam trace will be similar in general to the line 35, but displaced farther from the undeflected or straight line position 33. If the magnet be turned end for end, to reverse the north and south poles, the beam trace will be similarly curved but in a reverse direction and on the opposite side of the undeflected line 33, as indicated by the broken line 37. By the simple setup of FIG. 2, it can be seen that an indication of the strength and polarity of a magnet is easily and conveniently obtained. However, this arrangement by itself is not suitable for determining and mapping the lines of equal magnetic force. Such lines can be mapped, according to the present invention, by utilizing the arrangement shown in FIG. 1.

In FIG. 1 is shown a cathode ray oscilloscope having a casing or housing 11 placed in a vertical or substantially erect position, so that the face 13 of the cathode ray tube 15 is approximately horizontal. Secured to the face 13 or to the grid overlying the tube is a transparent sheet 17 of paper, plastic or the like. The transparent sheet 17 has printed or otherwise suitably marked on it a plurality of concentric circles, three such circles 19, 21, and 23 being here illustrated. As will be more apparent from the discussion to follow, each of the circles is used to plot a single line of magnetic force, and as many circles are provided as are desired lines of equal magnetic flux. Furthermore, complete circles are not required for plotting the lines of magnetic force on only one side of the magnet and, if desired, only portions of concentric circles may be marked on the transparent sheet 17, although these portions should at least be semi-circles. If desired, the sheet 17 may be a non-transparent mask having a plurality of concentric circular slits, of a type similar to that of the mask to be described with regard to FIG. 4.

The electron beam of the cathode ray tube 15 is converged to a spot 25. The sheet 17 is located on the face 13 of the tube 15 such that the center of the concentric circles 19, 21, and 23 overlies the rest position of the spot 25.

The magnet 27 to be tested is here shown as a permanent bar magnet, although it is to be understood that the method of the present invention is equally adaptable to testing magnets having other shapes, such as horseshoes, and may be used for testing electromagnets, as well as permanent magnets. In order to plot the lines of equal magnetic flux of the magnet 27, the magnet 27 is secured by cementing or the like to a transparent recording sheet 29 of paper, plastic or the like. The sheet 29 having the magnet 27 secured to it is then placed on top of the sheet 17.

The magnet 27 deflects the spot 25 of the cathode ray tube from its rest position, the extent and direction of deflection depending on the strength and polar orientation of the magnet 27 and its distance from the rest position of the spot. Equal deflections of the spot 25 to any particular radial distance such as that indicated by any one of circles 19, 21, or 23 are produced by equal magnetic fields. Use of equal deflections of the spot 25 is made to plot lines of equal magnetic flux of the magnet 27.

Figure 3:
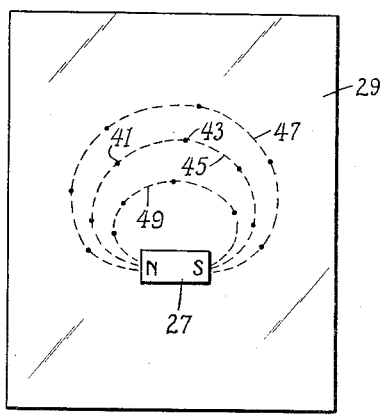
FIG. 3 is a top view of the magnet illustrated in FIG. 1 shown applied to a transparent sheet on which various points or lines of equal magnetic flux have been marked, these points being connected together.

To plot a line of equal magnetic flux or force, the magnet 27 and attached transparent sheet 29 are slid over the sheet 17 until the spot 25 is deflected to any point on, for instance, circle 21. At this point a mark 41 is made on the transparent sheet 29 overlying the deflected spot 25, using a pencil, crayon, or the like. The magnet and attached sheet are then moved to a different position wherein the spot 25 falls on a different portion of the circle 21. This point is marked on the sheet 29 and the procedure is repeated several times on a semi-circular portion of the circle 21. The result, as seen in FIG. 3, is that several points such as 41, 43, and 45 are marked on the sheet 29, all representing equal deflections of the beam of the cathode ray tube and therefore positions of equal force of the magnet. These and other similar points representing th same force or strength fall roughly on a line or a loop portion extending from the north pole of the magnet 27 to the south pole. These points may be connected together to provide a permanent record of a line of equal magnetic force.

In similar fashion, the magnet 27 may then be moved to various other positions so as to deflect the spot 25 to various portions of other strength circles, such as the circle 19 and the circle 23, so as to produce other lines of equal magnetic force 47 and 49, respectively.

The position of the magnet 27 may be marked on the sheet 29 so that the magnet may thereafter be removed from the sheet. The resulting transparent sheet 29 with its indication of the magnet position and the lines of equal magnetic flux provides a permanent record of the characteristics of a particular magnet or magnetic circuit.

Of course, the lines of magnetic force on the other side of the magnet may be plotted in a manner identical to that described, although this is not necessary in cases where the lines on either side as symmetrical. The magnetic field mapped in this manner may be used for design and research purposes, or even for production tests of magnets.

The sensitivity of deflection of the spot 25 may be changed by changing the voltage of the accelerating anode of the cathode ray oscilloscope 11. For covering a wide range of sensitivity, this adjustment can be conveniently coupled with a bias adjustment to keep a constant brightness, and with the focus adjustment. In this manner, a single cathode ray oscilloscope may be used to map the magnetic field of a wide range of strengths of magnets.

Figure 4:
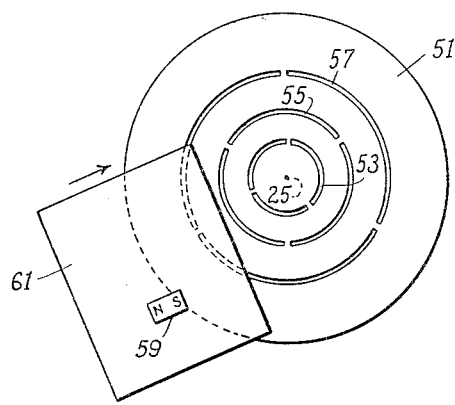
FIG. 4 is a top view of a cathode ray tube and magnet arranged for directly photographing lines of equal magnetic flux.

A method and apparatus for photographing lines of equal magnetic flux is illustrated in FIG. 4. For this purpose, a mask 51 of a non-transparent material is positioned to cover the entire face 13 of the cathode ray tube. A series of concentric circular slits or transparent portions 53, 55, and 57 are provided in the mask 51, substantially concentrically with respect to the undeflected or rest position of the beam spot 25. The bar magnet 59 to be tested is in this case fastened to the upper surface of a recording sheet 61 of photographic film or paper, having its photosensitive layer or emulsion on its lower face. The sheet 61 carrying the bar magnet 59 is then placed on top of the mask 51. Of course, these operations are carried out under suitable darkroom conditions or within a darkened box of suitable construction.

The film 61 is systematically slid in various directions over the mask 51. In a manner identical to that explained with regard to FIG. 1, the light spot 25 is deflected from its rest position and at various positions of the magnet 59 the light spot crosses the circular light-transmitting rings or slits 53, 55, and 57, so as to expose a dot on the under surface or emulsion side of the photographic sheet 61. If the magnet 59 is moved about the entire face 13 of the cathode ray tube, it is seen that the deflected light spot 25 crosses the circular slits at a number of circumferential points on the slits. The film 61 when developed will contain a number of dots similar to the points 41, 43, and 45 marked on the transparent sheet 29 of FIG. 3. The dots of each separate series formed by exposure through an individual one of the concentric circles are then connected together by hand to provide lines of magnetic force extending from the north pole continuously to the south pole of the magnet. Or, if the magnet has been moved back and forth through paths of travel sufficiently close to each other, the photographically produced markings may form continuous or almost continuous lines, requiring no further fill-in or connection by hand.

When plotting photographically, the lines on both sides of the magnet are preferably plotted, inasmuch as the magnet 59 is moved over both halves of the mask 51 and cathode ray tube face 13. The position of the magnet 59 on the photographic film 61 is marked, and then transferred to the opposite or emulsion side so that the outlines of the magnet appear on the developed prints.

In both of the arrangements of FIGS. 1 and 4, a calibration may be effected by using a magnet of known strength and characteristics to determine the magnetic force required to move the spot 25 from its rest position to each of the concentric circles 19, 21, or 23 of FIG. 1, or to the concentric slits 53, 55, and 57 of FIG. 4. Of course, this calibration applies only to a particular accelerating voltage and adjustment of the cathode ray oscilloscope.

The method and apparatus for mapping lines of equal magnetic flux as herein disclosed provides a permanent record of these lines directly without the need of an additional step as was required when using iron filings sprinkled on a sheet of paper or the like. The accuracy of the method is within 10% and compares favorably with lines produced by sprinkling iron filings. It is possible to use older cathode ray oscilloscopes in practicing the method, and furthermore a large cathode ray tube is not required.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

For instance, it is to be noted that the arrangement illustrated in FIG. 2 may be used for the production testing of magnets. After the oscilloscope has been calibrated or provided with a scale, the strength and polarity of a series of magnets may be determined simply by placing them one at a time on an oscilloscope and noting the deflection of the electron beam. Although not here shown, the symmetry of the field of a ring-shaped magnet may be tested by noting the deflection of a circular electron beam, deviations of the deflected beam from a true circle being indicative of a unsymmetrical field. Weak magnets or pieces of ferromagnetic material having residual magnetism may be tested by placing them close to the neck of a cathode ray tube and noting the deflection of the electron beam.

What is claimed is:

1. A method of testing magnets comprising the steps of placing a magnet on the face of a cathode ray tube to deflect the electron beam thereof and indicating the relative position of the magnet and deflected electron beam for equal deflections of the electron beam.

2. A method of mapping lines of equal magnetic flux around a magnetic circuit comprising the steps of securing a magnet to a recording sheet, placing said magnet and sheet on the face of a cathode ray tube to deflect the electron beam thereof, and indicating on said sheet points of equal deflection of the electron beam, said points lying on a line of equal magnetic flux.

3. A method of mapping lines of equal magnetic flux around a magnetic circuit comprising the steps of securing a magnet to a recording sheet, placing said magnet and sheet on the face of a cathode ray tube to deflect the electron beam thereof, moving said magnet and sheet over the face of the cathode ray tube to produce equal deflections of the electron beam at various circumferential positions, marking on said sheet points of equal deflection, and connecting together said points of equal deflection to provide a line of equal magnetic flux.

4. A method of mapping lines of equal magnetic flux around a magnetic circuit comprising the steps of securing a magnet to a transparent recording sheet, placing said magnet and sheet on the face of a cathode ray tube to deflect the electron beam thereof, sliding said magnet and sheet over the face of the cathode ray tube to produce equal deflections of the electron beam at various radial distances, marking on said transparent sheet points of equal deflection, and connecting together said points of equal deflection at each of said radial distances to provide a plurality of lines of equal magnetic flux.

5. A method of photographing lines of equal magnetic flux around a magnetic circuit comprising the steps of securing a magnet to the upper surface of a sheet of photographic material, masking the face of a cathode ray tube with a mask having a circular transparent portion, placing said magnet and sheet on said mask, and moving said magnet and sheet in various directions over said mask to deflect the electron beam of the cathode ray tube to various circumferential portions of said circular transparent portion, whereby the electron beam exposes portions of the sheet lying on a line of equal magnetic flux of the magnet.

6. A method of photographing lines of equal magnetic flux around a magnetic circuit comprising the steps of securing a magnet to the upper surface of a sheet of photographic material, masking the face of a cathode ray tube with a mask having a plurality of concentric slits, placing said magnet and sheet on said mask, and moving said magnet and sheet in various directions over said mask to deflect the electron beam of the cathode ray tube to various circumferential portions of said slits, whereby the electron beam exposes portions of the sheet lying on lines of equal magnetic flux of the magnet.

7. Apparatus for testing magnets comprising, in combination, a cathode ray tube having secured to the face thereof means designating a circular arc with its center approximately overlying the rest position of the electron beam of said tube, and a recording sheet movably positioned substantially parallel to said tube face having means for immovably positioning a magnetic flux producing member to be tested thereon.

8. Apparatus for testing magnets comprising a cathode ray tube having secured to the face thereof means designating a circular arc with its center approximately overlying the rest position of the electron beam of said tube, a recording sheet, and a magnet secured to said recording sheet, said sheet oriented in cooperative relationship with said electron beam of said tube and said means designating a circular arc.

9. Apparatus for plotting lines of equal magnetic flux around a magnetic circuit comprising a cathode ray tube having means forming a circular arc secured to the face thereof, said arc being substantially concentric with the rest position of the electron beam of said tube, a transparent recording sheet, and a magnet secured to said recording sheet, said sheet and secured magnet lying on said tube face oriented in cooperative relationship with said electron beams of said tube and said means forming a circular arc whereby said lines of equal magnetic flux may be plotted on said transparent recording sheet when said electron beam is deflected.

10. Apparatus for photographing lines of equal magnetic flux around a magnet circuit comprising a cathode ray tube, a non-transparent mask secured to the face of said tube and having a circular slit, the center of said slit approximately overlying the rest position of the electron beam of said tube, a sheet of photographic material, and a magnet secured to the upper surface of said sheet, said sheet and attached magnet lying on said tube face oriented in cooperative relationship with said electron beam of said tube and said non-transparent mask.

11. Magnet testing means comprising, in combination, a cathode ray tube adapted to project a magnetically deflectable beam of energy onto a screen, said beam occupying a predetermined position on said screen in the absence of magnetic deflecting forces, a series of arcs marked on said screen concentrically with said predetermined position and with each other, said arcs being at different radial distances from said predetermined position, and a recording sheet moveably positioned over said screen having means for immovably positioning a magnet to be tested thereto, said recording sheet oriented in cooperative relationship with said electron beam over said screen whereby the position of said electron beam is recorded on said recording sheet when said electron beam is deflected.

12. A construction as defined in claim 11, in which said screen is substantially at the face of said tube and in which said recording sheet is transparent so that the deflected position of said beam may be seen through said recording sheet and may be manually marked thereon.

13. A construction as defined in claim 11, in which said screen is substantially at the face of said tube and in which said arcs are formed by light-transmitting portions of said screen, the rest of the area of said screen being substantially opaque, and in which said recording sheet has a photosensitive coating subject to exposure by light passing through said light-transmitting arcs.

References Cited in the file of this patent

UNITED STATES PATENTS

| | | |
|---|---|---|
| 1,895,373 | Bruche | Jan. 24, 1933 |
| 2,246,259 | Machts | June 17, 1941 |
| 2,458,634 | Peterson | Jan. 11, 1949 |
| 2,538,158 | Long | Jan. 16, 1951 |